(12) United States Patent
Baccouche et al.

(10) Patent No.: US 8,500,191 B1
(45) Date of Patent: Aug. 6, 2013

(54) FRANGIBLE CONNECTOR FOR A VEHICLE

(75) Inventors: Mohamed Ridha Baccouche, Ann Arbor, MI (US); Jamel E. Belwafa, Ann Arbor, MI (US); Christopher Stephen O'Connor, Livonia, MI (US); Thierry Guimberteau, West Bloomfield, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/348,914

(22) Filed: Jan. 12, 2012

(51) Int. Cl.
*B62D 25/20* (2006.01)
(52) U.S. Cl.
USPC ............ 296/187.08; 296/204; 280/784
(58) Field of Classification Search
USPC ........... 296/29, 35.2, 187.08, 187.09, 187.11, 296/193.07, 203.02, 203.04, 204; 280/784, 280/124.09; 188/376; 180/232
See application file for complete search history.

(56) References Cited

U.S. PATENT DOCUMENTS

| | | | |
|---|---|---|---|
| 3,697,108 A * | 10/1972 | Diener | ............................ 293/133 |
| 4,040,640 A | 8/1977 | Begg | |
| 5,738,378 A | 4/1998 | Yazejian | |
| 7,740,278 B2 | 6/2010 | Kakuta et al. | |
| 2010/0032542 A1 | 2/2010 | Heitkamp et al. | |

* cited by examiner

*Primary Examiner* — Joseph Pape
*Assistant Examiner* — Dana Ivey
(74) *Attorney, Agent, or Firm* — Jason Rogers; Brooks Kushman P.C.

(57) ABSTRACT

A frangible vehicle sub-frame joint between a sub-frame and compartment pan. The sub-frame defines a clearance area forward of a collar. In a collision event, the collar is separated into a breakaway portion and a portion that is retained by the sub-frame. The breakaway portion breaks into a clearance area defined in front of the frame joint when the sub-frame is subjected to a front end impact.

16 Claims, 5 Drawing Sheets

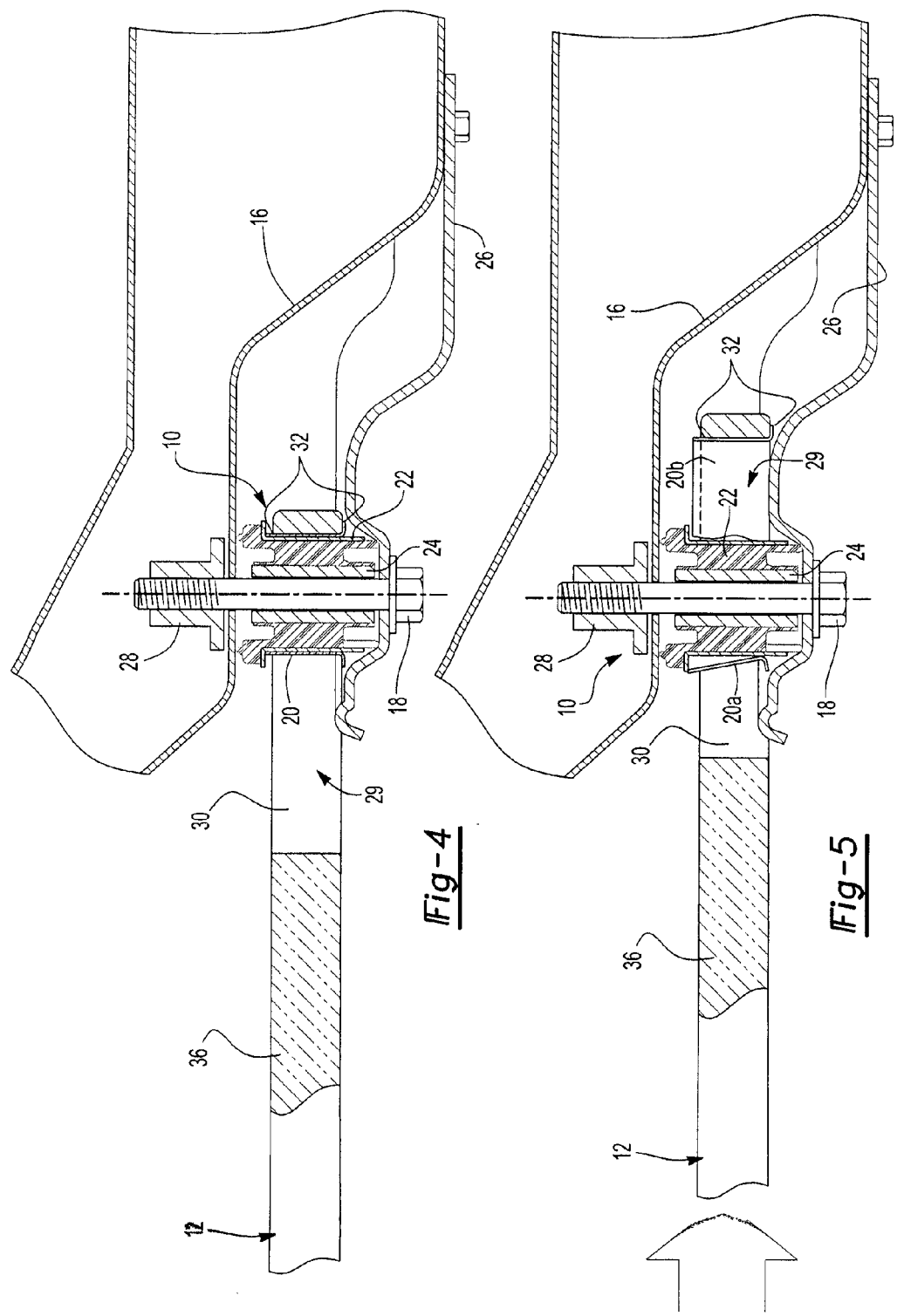

US 8,500,191 B1

FRANGIBLE CONNECTOR FOR A VEHICLE

TECHNICAL FIELD

This disclosure relates to a frame connector that breaks in an impact to reduce the extent of intrusion into the passenger compartment and generally soften the pulse of the impact.

BACKGROUND

Vehicles are tested for crash worthiness and are rated based upon factors such as intrusion and vehicle pulse performance. One parameter in testing vehicle design is the extent of any intrusion into a passenger compartment of a vehicle as a result of a crash test. The pulse of an impact is another parameter of vehicle design that is measured as the deceleration in a collision over time.

Vehicles are designed to absorb impacts with crush cans, crumple zones, and the like. The goal is to provide a more controlled kinematic design for a vehicle in the event of a collision event. Frame members are normally secured to the vehicle body with pin connectors that are designed to remain intact and hold the frame members and vehicle body together. Pin connectors must be strong enough to provide a robust connection between the parts connected by the pin. For example, a pin connector for a rear arm sub-frame connection to the frame rail and passenger compartment is intended to provide a robust connection.

This disclosure is directed to solving the above problems and other problems as summarized below.

SUMMARY

According to one aspect of this disclosure, a vehicle frame joint is provided that comprises a frame member defining an opening, a collar and a pin. The collar defines a receptacle assembled into the opening with a first portion of the collar attached to the frame member. A clearance space is defined between a second portion of the collar and the frame member in a first direction. The pin is inserted in the receptacle with the second portion of the collar being displaced into the clearance space upon an impact to disconnect the frame member from the pin.

According to other aspects of the disclosure, the first portion of the collar is supported by the frame member on the opposite side of the collar from the clearance space.

An isolator ring may be provided within the collar that receives the pin. The frame member may be a rear arm of a sub-frame that supports an engine of the vehicle. The rear arm may be secured to a compartment pan by the pin to drop down below the compartment pan when the frame member is disconnected from the pin. During the impact, the rear sub-frame arm may be separated from the compartment pan when the collar shears and the second portion of the collar is displaced into the clearance space.

According to another aspect of the disclosure, a frangible joint in a vehicle is provided that comprises a frame part defining an opening, a collar received in the opening; and a pin is received in the collar to secure the frame part to the vehicle. The first opening defines a clearance space that extends radially outwardly from the collar in one direction toward an anticipated impact location. A portion of the collar is predisposed to break into the clearance space in response to an impact at the anticipated impact location.

According to other aspects of the disclosure, the frame part is intended to separate from the pin when the collar breaks. The collar may have a backing portion that is attached to the frame part on the opposite side of the collar from the clearance space.

The frame part may be a rear sub-frame arm that supports an engine of the vehicle. The rear sub-frame arm may be secured to the pin to drop down the pin when the rear sub-frame arm is disconnected from the pin. A front bumper beam may be attached to the sub-frame for protection in a frontal impact. During the impact, the rear sub-frame arm of the sub-frame is separated from the pin when the collar breaks and a front portion of the collar may be displaced into the clearance space.

According to yet another aspect of the disclosure, a sub-frame assembly is provided for a vehicle having a passenger compartment that includes a floor. The sub-frame assembly comprises a sub-frame and a rear sub-frame arm defining an opening. A pin secures the sub-frame through the frame rail to the compartment pan. The pin is received in a collar that is assembled to the opening to a rear portion of the collar that is partially attached to the rear sub-frame arm. A clearance area is defined between the opening and a front portion of the collar. A force applied to the vehicle that is transferred to the sub-frame assembly may cause the rear sub-frame arm to fracture the collar with the rear portion of the collar separating from the front portion of the collar that moves into the clearance space.

According to other aspects of the sub-frame assembly, the rear sub-frame arm may separate from the compartment pan when the collar fractures. The rear portion of the collar may be welded to the rear sub-frame arm on the opposite side of the collar from the clearance area. The rear sub-frame arm may be secured below the compartment pan to drop down from the compartment pan when the rear portion of the collar separates from the front portion. The force applied to the vehicle may be from a frontal impact and during the frontal impact the rear sub-frame arm may separate from the compartment pan.

The aspects of the summarized above and other aspects will be better understood with reference to the attached drawings and the following detailed description of the illustrated embodiments.

BRIEF DESCRIPTION OF THE DRAWINGS

FIG. 4 is a fragmentary longitudinal cross-sectional view of the rear sub-frame arm connected by a frame joint to the vehicle compartment pan;

FIG. 5 is a fragmentary longitudinal cross-sectional view of the rear sub-frame arm, frame joint and compartment pan with the collar broken;

DETAILED DESCRIPTION

A detailed description of the illustrated embodiment of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
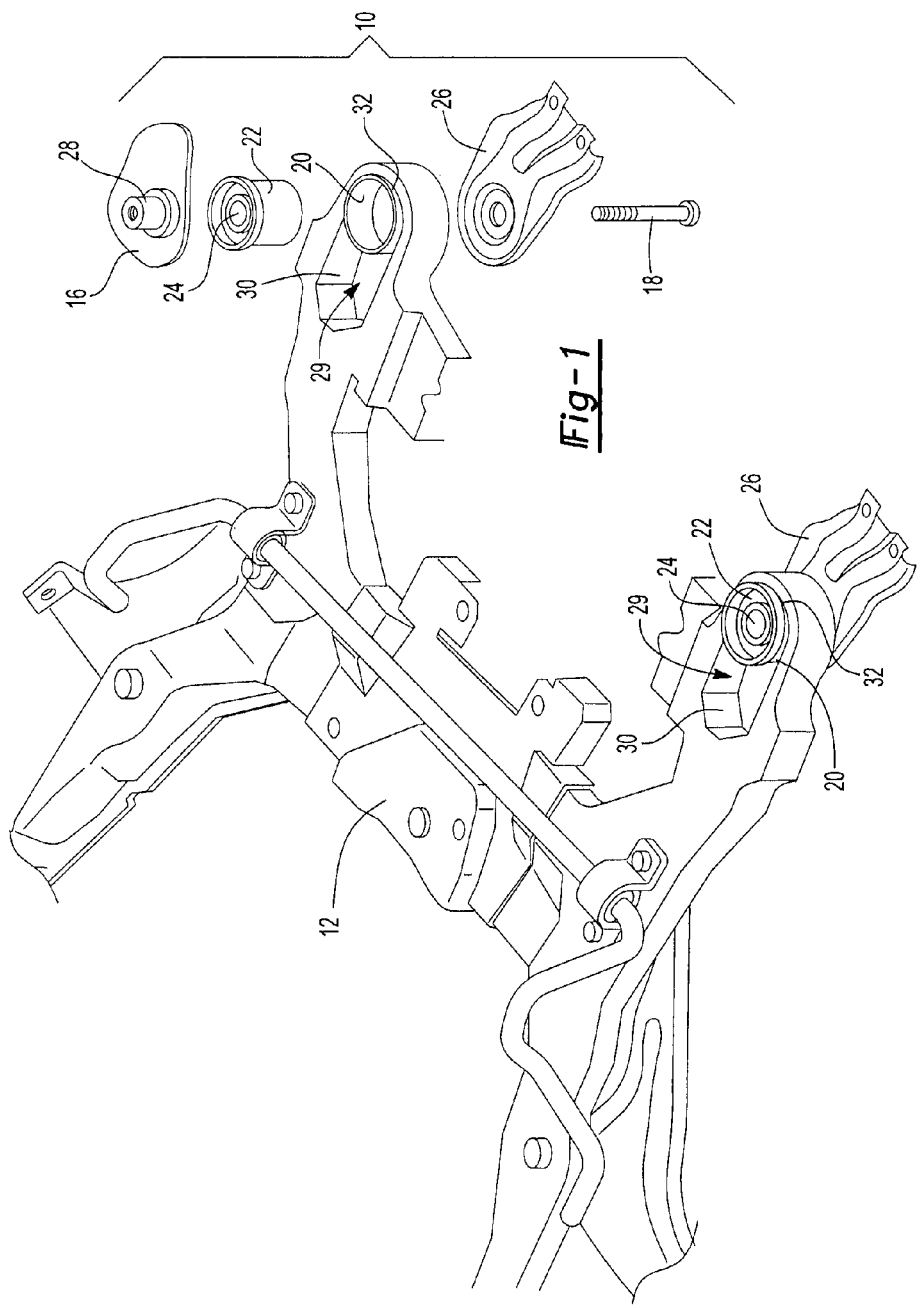
FIG. 1 is a partially exploded perspective view of a sub-frame and frame joint for connecting the sub-frame to a vehicle compartment pan.

Referring to FIG. 1, frame joint, generally indicated by reference numeral 10, is shown with its component parts in an exploded perspective view on the right side of a sub-frame 12. Some of the component parts of the frame joint 10 are shown to be assembled on the left side of the sub-frame 12. The sub-frame 12 is the portion of the frame of the vehicle that supports the engine (not shown) on the frame rails (not shown). A portion of a compartment pan 16 is also illustrated. The frame joint 10 includes a pin 18 and a collar 20 that are assembled together with an isolator ring 22. The isolator ring 22 is an elastomeric member that isolates noise and vibration that may be conducted through the frame and sub-frame to the compartment pan 16. The isolator ring 22 retains a receptacle 24 for the pin 18. The engine and other functional elements of the vehicle are sources of noise and vibration that are intended to be reduced or limited by the isolator ring 22.

The frame joint also includes a bracket 26 in which the pin 18 is inserted that is disposed below the sub-frame 12. The pin 18 is inserted through the bracket 26, and isolator ring 22 and is secured in place by a weld nut 28. Weld nut 28 is welded to the compartment pan 16.

An opening generally indicated by reference numeral 29 is defined by the sub-frame 12. A clearance area 30 is defined in front of the collar 20 in the sub-frame 12. The collar 20 is also received within the opening 29 and is secured to the sub-frame 12 by welding to a welded region 32 comprising a generally semi-circular area on a rear portion of the collar 20. The welded region 32 secures the collar 20 to the sub-frame 12. The welded region 32 may also be referred to as the tensioned area.

Figure 2:
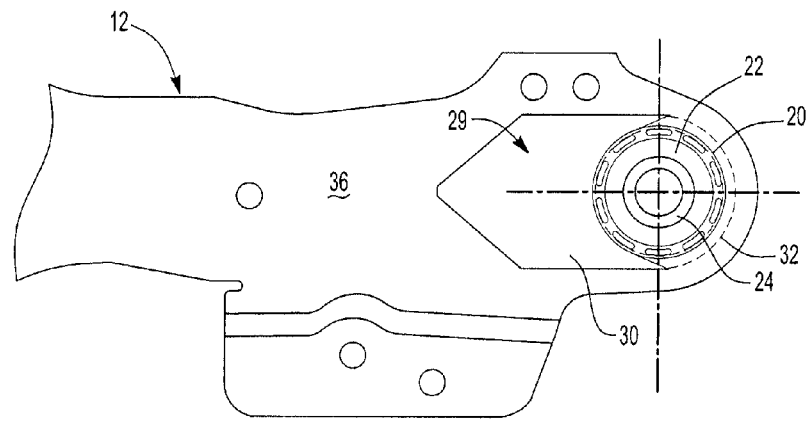
FIG. 2 is a diagrammatic plan view of a rear sub-frame arm, collar and isolator ring in an installed condition.

Referring to FIG. 2, the rear sub-frame arm 36 may be an integral part of the sub-frame as shown in FIG. 1 or may be a separate part fastened to the sub-frame 12. The rear sub-frame arm 36 defines the clearance area 30 forward of the collar 20 and isolator ring 22. As shown in FIG. 2, the collar 20 is intact and appears as it would appear when the sub-frame arm 36 is in its normal condition with the isolator ring 22, collar 20 and welded region 32 secured together.

Figure 3:
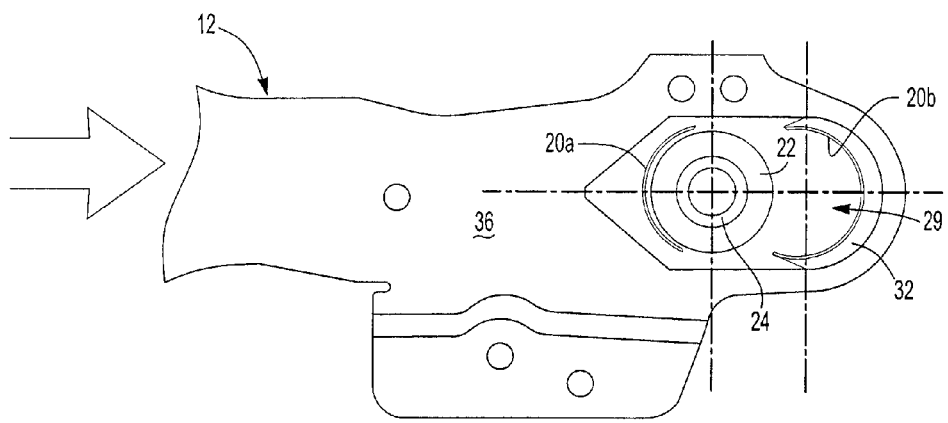
FIG. 3 is a diagrammatic plan view of the rear sub-frame arm, collar and isolator ring in a post-impact condition.

Referring to FIG. 3, the rear sub-frame arm 36 is shown after an impact, indicated by the arrow shown to the left side of FIG. 3, is imparted to the vehicle. As a result of the impact force represented by the arrow, the rear sub-frame arm 36 is driven rearward causing the collar 20 shown in FIG. 2 to separate into a breakaway portion 20a and a retained portion 20b. The isolator ring 22 is shown moving with the breakaway portion 20a, although it should be understood that in the dynamics of a collision event, some random displacement of the breakaway portion 20a and isolator ring 22 may occur. The breakaway portion 20a may break only on one side of the collar 20 and may remain attached to the retained portion 20b.

Referring to FIG. 4, the rear sub-frame arm 36 is shown to be attached by the pin 18 to the compartment pan 16. The frame joint 10 is shown intact with the collar 20 encircling the isolator ring 22. The welded regions 32 are at the top and bottom on the opposite side of the collar 20 from the front of the vehicle and clearance area 30. The bracket 26 is attached to the bottom of the isolator ring 22 by the pin 18 and the pin 18 is shown to be secured in place by the weld nut 28.

Referring to FIG. 5, an impact indicated by an arrow on the left side of the figure is shown driving the rear sub-frame arm 36 rearward as would be expected to occur in the event of a front end collision. As shown in FIG. 5, the collar 20 shown in FIG. 4 is separated into a breakaway portion 20a and a retained portion 20b. The retained portion 20b remains secured to the rear sub-frame arm 36 at the welded region 32. As previously described with reference to FIG. 3, the isolator ring 22 is shown moving with the breakaway portion 20a, although it should be understood that in the dynamics of a collision event, some random displacement of the breakaway portion 20a and isolator ring 22 may occur. The breakaway portion 20a may break only on one side of the collar 20 and may remain attached to the retained portion 20b.

Figure 6:
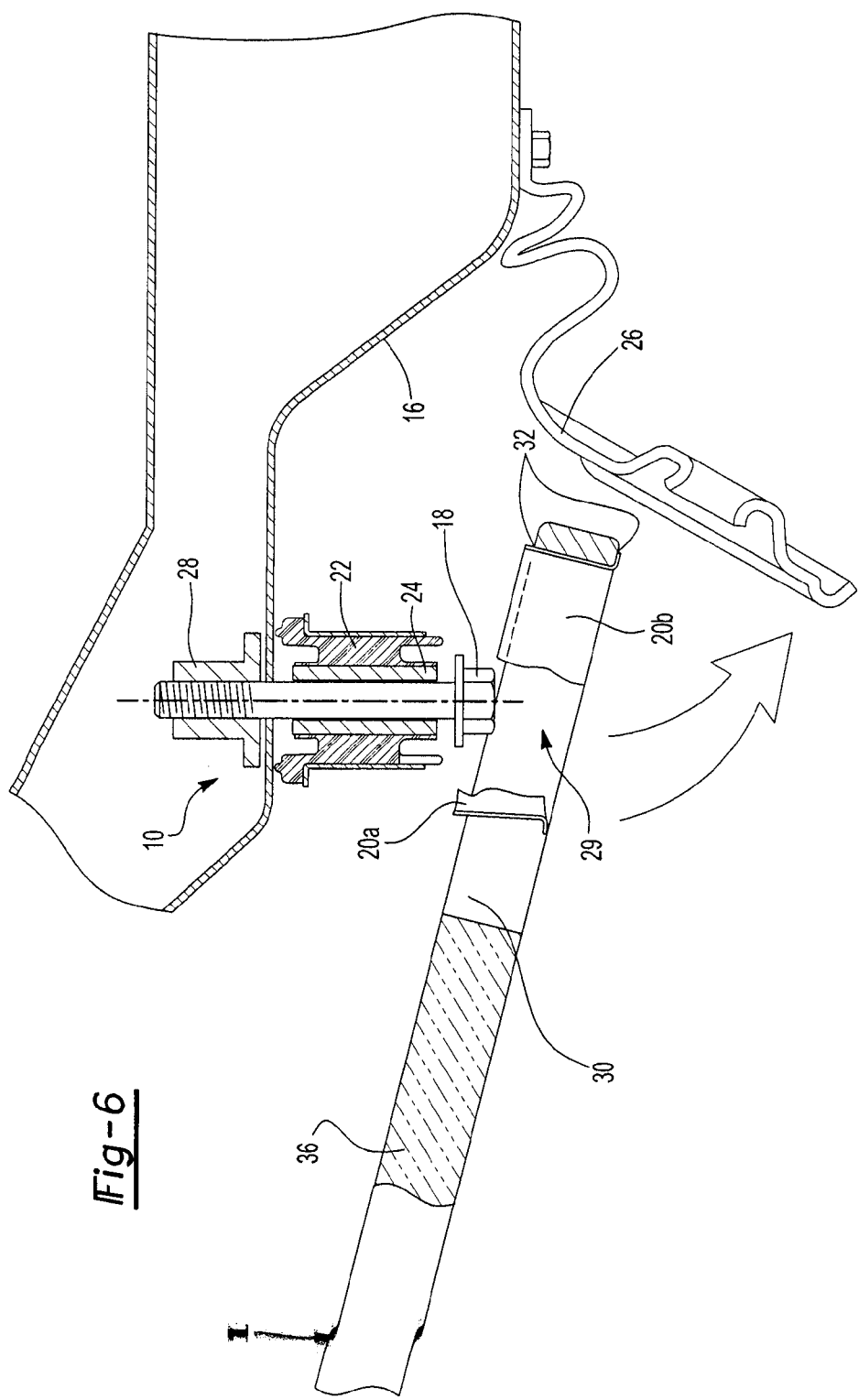
FIG. 6 is a fragmentary longitudinal cross-sectional view of the rear sub-frame arm dropping down away from the isolator ring after breaking the collar.

Referring to FIG. 6, the rear sub-frame arm 36 is shown dropping down and away from the isolator ring 22 and pin 18. The breakaway portion 20a of the collar is broken away from the retained portion 20b. The retained portion 20b of the collar drops with the rear sub-frame arm 36 clear of the isolator ring 22. The rear sub-frame arm 36 either separates or deforms the bracket 26 to permit the rear sub-frame arm 36 to drop down.

In a collision event, separating and dropping the sub-frame 12 and rear sub-frame arm 36 from the isolator ring 22 and pin 18 may provide additional protection to occupants of the passenger compartment and increases the space available to absorb energy and minimize any intrusion in the passenger compartment or tendency of the compartment pan 16 to be impacted. Increasing the space available for energy absorption, softens the pulse of the impact. The collar 20, shown in FIG. 4, is separated into the breakaway portion 20a and retained portion 20b. The force for separating the breakaway portion 20a from the retained portion 20b requires much less energy than the energy required to shear the pin 18. The pin 18 may be specified to be a robust pin that is not expected to shear in the event of a collision event. The robustness of the pin 18 assures the integrity of the connection between sub-frame 12 and the compartment pan 16.

Figure 7:
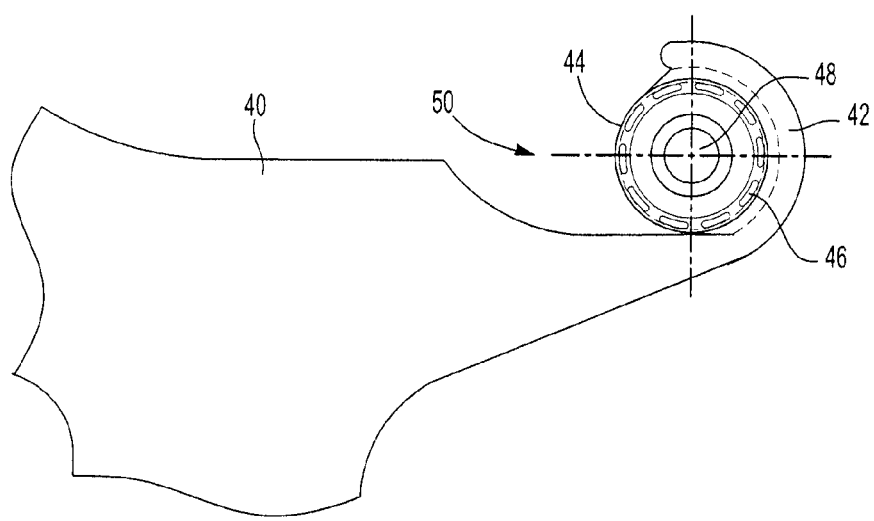
FIG. 7 is a diagrammatic plan view of an alternative embodiment of a rear sub-frame arm, collar and isolator ring in an installed condition.

Referring to FIG. 7, an alternative embodiment of a sub-frame 40 is illustrated in which a hook-shaped end 42 is provided to retain a collar 44, isolator ring 46 and pin 48. The area 50 in front of the collar 44 defines a clearance space. In the event of a front end collision, the sub-frame 40 would be driven rearward, or from left to right as shown in the drawing. The collar 44 would break and the isolator ring 46 and pin 48 would separate from the sub-frame 40. The sub-frame 40 is then free to drop down as previously described with reference to the embodiment of FIGS. 1-6.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle frame joint comprising:
   a sub-frame defining an opening;
   a collar retains a receptacle, wherein the collar is assembled into the opening, a first portion of the collar is attached to the sub-frame, a clearance space is defined between a second portion of the collar and the opening in the sub-frame in a first direction;

a pin inserted in the receptacle, wherein the second portion of the collar is displaceable into the clearance space upon an impact to disconnect the sub-frame from the pin; and an isolator ring is disposed within the collar, and wherein the receptacle receives the pin.

2. The vehicle frame joint of claim 1 wherein the first portion of the collar is supported by the sub-frame on an opposite side of the collar from the clearance space.

3. The vehicle frame joint of claim 1 wherein the sub-frame is a rear sub-frame arm of the sub-frame.

4. The vehicle frame joint of claim 3 in combination with a compartment pan and wherein the rear sub-frame arm is secured to the compartment pan by the pin and drops down below the compartment pan when the sub-frame is disconnected from the pin.

5. The vehicle frame joint of claim 4 wherein the impact is a frontal impact and during the frontal impact the rear sub-frame arm is separated from the compartment pan and the second portion of the collar is displaced into the clearance space.

6. A frangible joint in a vehicle comprising:
a frame part defining an opening;
a collar received in the opening; and
a pin received in the collar for securing the frame part to the vehicle, wherein the opening defines a clearance space that extends radially outwardly from the collar in one direction toward an anticipated impact location, and wherein a portion of the collar is positioned to break into the clearance space in response to an impact at the anticipated impact location.

7. The frangible joint of claim 6 wherein the frame part separates from the pin when the collar breaks into the clearance space.

8. The frangible joint of claim 6 wherein the collar has a tensioned area that is attached to the frame part on an opposite side of the collar from the clearance space.

9. The frangible joint of claim 6 wherein the frame part is a rear sub-frame arm of a sub-frame.

10. The frangible joint of claim 9 wherein the rear sub-frame arm is secured to the pin to drop down from the pin when the portion of the collar breaks into the clearance space in response to the impact and the rear sub-frame arm is disconnected from the pin.

11. The frangible joint of claim 10 wherein the impact is a frontal impact and during the frontal impact the rear sub-frame arm is disconnected from the pin when the collar breaks and the portion of the collar is displaced into the clearance space.

12. A sub-frame assembly for a vehicle having a passenger compartment that includes a compartment pan, the sub-frame assembly comprising:
a sub-frame having a rear sub-frame arm defining an opening;
a pin securing the rear sub-frame arm to the compartment pan;
a collar is assembled into the opening in the rear sub-frame arm, wherein a rear portion of the collar is partially attached to the rear sub-frame arm with a clearance space defined between the opening and a front portion of the collar; and
wherein a force applied to the vehicle that is transferred to the sub-frame assembly causes the rear sub-frame arm to fracture the collar with the rear portion of the collar separating from the front portion of the collar that moves into the clearance space.

13. The sub-frame assembly of claim 12 wherein the rear sub-frame arm separates from the compartment pan when the rear portion of the collar separates from the front portion of the collar.

14. The sub-frame assembly of claim 12 wherein the rear portion of the collar is welded to the rear sub-frame arm on an opposite side of the collar from the clearance space.

15. The sub-frame assembly of claim 12 wherein the rear sub-frame arm is secured below the compartment pan and drops down from the compartment pan when the rear portion of the collar separates from the front portion of the collar.

16. The sub-frame assembly of claim 15 wherein the force applied to the vehicle is from a frontal impact and during the frontal impact the rear sub-frame arm separates from the compartment pan.

\* \* \* \* \*